Figure 1:
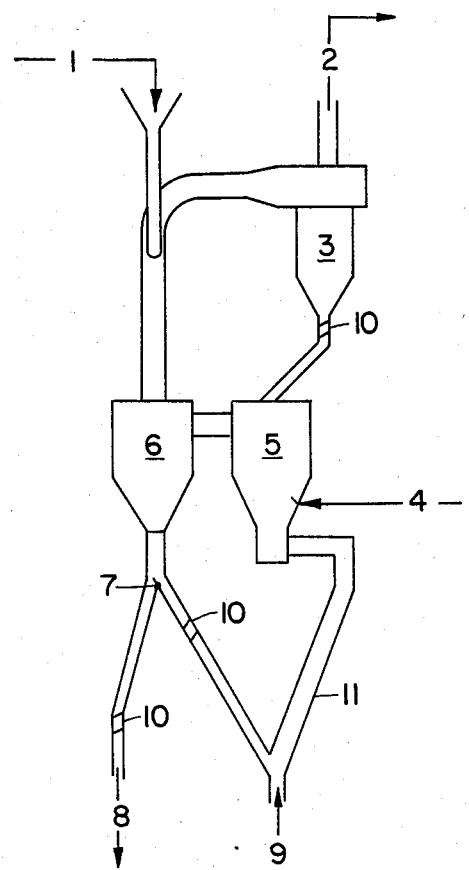

United States Patent [19]

Keren et al.

[11] Patent Number: 4,511,543

[45] Date of Patent: Apr. 16, 1985

[54] METHOD FOR BENEFICIATION OF PHOSPHATE ROCK

[75] Inventors: Yehuda Keren, Kiryat Motzkin; Shmuel Carmon, Arad; Meyer Behar, Beer-Sheva; Shimshon Axelrod, Haifa, all of Israel

[73] Assignee: Negev Phosphates Ltd., Dimona, Israel

[21] Appl. No.: 590,278

[22] Filed: Mar. 16, 1984

[30] Foreign Application Priority Data

Mar. 14, 1983 [IL] Israel .................................. 68400

[51] Int. Cl.$^3$ ............................ C01F 1/00; C01F 5/00
[52] U.S. Cl. ................................... 423/167; 423/107; 423/319
[58] Field of Search ................ 423/167, 316, 319, 107

[56] References Cited

U.S. PATENT DOCUMENTS

| | | | |
|---|---|---|---|
| 1,161,885 | 11/1915 | Rigg | 423/107 |
| 4,017,585 | 4/1977 | Angevine et al. | 423/319 |
| 4,263,262 | 4/1981 | Jukkola | 423/167 |
| 4,389,380 | 6/1983 | Parks | 423/167 |

Primary Examiner—Gregory A. Heller
Attorney, Agent, or Firm—Morgan, Finnegan, Pine, Foley & Lee

[57] ABSTRACT

The present invention relates to a method for beneficiation of phosphate rock by a thermal treatment, wherein an appreciable increase in $P_2O_5$ and decrease in cadmium contents in the calcined product are achieved. According to the invention, the phosphate rock is contacted with hot gases possessing a temperature in the range of between 700° C. to 1600° C. for a period of below 60 seconds and subsequently the fines are removed by a conventional classification method thus obtaining an up-graded phosphate product with a relatively low cadmium content. The up-graded phosphate product is also characterized by a relatively low sulfide content as well as low organic matter, which are very advantageous in the phosphoric acid manufacture therefrom. One of the advantages of the method is the almost complete recovery of the $P_2O_5$ present in the phosphate rock since no slaking for calcium oxide removal is utilized.

8 Claims, 2 Drawing Figures

METHOD FOR BENEFICIATION OF PHOSPHATE ROCK

The present invention relates to a method for the beneficiation of phosphate rock. More particularly, the invention relates to a method for the beneficiation of phosphate rock by a thermal treatment.

Phosphate rock is found in many places in the world in deposits of varying compositions and various grades. It is a general goal to sell a phosphate rock with a high $P_2O_5$ content and when only low grade phosphate rocks are available, up-grading is essential to provide a saleable product. Also, as known, some phosphate rocks contain as an impurity, heavy metals, such as cadmium in quantities which are quite high. The cadmium is solubilized in the acidulation circuit and the use of fertilizers containing soluble cadmium will result in contamination of the ground water. Cadmium is of course, highly poisonous as are other heavy metals. Another impurity present in phosphate rock is sulfide, which tends to remain in the calcined product. During the acidulation of such a calcined product for producing phosphoric acid, the sulfide impurity persists as highly reactive component of the acid solution which, as a consequence, is extremely corrosive in nature. This highly corrosive phosphoric acid solution can cause extensive damage to processing equipment and result in expensive downtime for repairs. Therefore, the removal of such impurities is also an important goal of a beneficiation treatment for phosphate rock. Of course one of the main criteria to be considered is the cost of the beneficiation method. Various methods are known for beneficiation of phosphate rock such as: wet and dry classification, flotation, calcination etc.

The approaches to be taken in beneficiation of phosphate rocks are directed by two sets of factors, the inherent rock properties and the general resource and economic background. Thus, calcination, which involves high fuel consumption in the order of about 50–100 kg fuel oil/ton product or power costs and large initial outlays for plant construction should be contemplated, if less costly means prove less effective, but not with equal precedence. Similarly, flotation, requiring large amounts of water, may also be considered a less favouravle measure, granting equal success to dry oredressing. Thus, in Florida the flotation technique requires four tons of water per ton of treated ore, and needs make-up of about 25% of the total water. Of course for many places the use of about 1 ton water per ton of ore will be prohibitive. Generally, for siliceous phosphate rock the flotation method seems to be more adequate whereas for calcareous phosphate rock the calcination method is more indicated.

In the calcination method the phosphate rock is heated at temperatures wherein the calcium carbonate is thermally decomposed, the carbon dioxide is expelled with the flue gases and the calcium oxide is removed by slaking with water from the calcined phosphate. The size and textural studies have shown that the apatite nodules are more compact and much coarser than the crystals of limestone matrix enclosing them.

Another factor which should be considered in all these known beneficiation methods is the percentage of $P_2O_5$ recovery. In the following Table 1, the results of the various known methods of beneficiation are summarized.

TABLE 1

Comparison of known beneficiation processes.

| The process | % $P_2O_5$ in feed | % $P_2O_5$ in product | % $P_2O_5$ recovery | weight recovery % | Remarks |
|---|---|---|---|---|---|
| Flotation | 28.6 | 32.9 | 86 | 75 | |
| Calcination (Low temperatures) | 32.0 | 32.4 | 96 | 90 | calcined at 435° C. |
| Calcination (including slaking) | 29.8 | 33.7 | 88.4 | 80 | |

From the above results it appears that only with flotation, or calcination including slaking for removal of the calcium oxide formed in said calcination, an actual up-grading of the phosphate rock is achieved. However, the flotation as well as the slaking operation require appreciable amounts of water. Furthermore, in the both methods the recovering of the $P_2O_5$ value in the concentrated fractions is relatively low.

According to U.S. Pat. No. 4,325,928 a process is described wherein phosphate rock is heated at a temperature in the range of between 380° to 600° C., claiming to obtain a product with a very low content of heat labile acid insoluble iron sulfide and with a lower organic matter content than in the original phosphate rock.

According to U.S. Pat. No. 4,017,585 it is claimed a process for calcining phosphate rock in a fluidized bed, in order to remove the cadmium impurity. As mentioned therein the calcination is carried out at a temperature of about 1000° C. to 1150° C., using a residence time of from 30 to 200 minutes. The process also prevents the formation of corrosive sulfide constituents.

In another recent U.S. Pat. No. 4,321,238 a process for beneficiation of phosphate rock by calcination at high temperature is described. As mentioned therein, the aim of the invention is to keep to a minimum the incidental interfering phenomena connected with phosphate burning, such as formation of calcium silicate from the resulting calcium oxide and silica present in the phosphate rock. The formation of calcium silicate is undesirable since it will stabilize a part of the calcium from the phosphate rock not bound to the phosphate and thus affects the extent of up-grading since the stabilized calcium could not be removed by washing. It is also mentioned that the thermal treatment causes a thermal shock to the phosphate rock and results in the brittleness of the particles and make the burned product more suitable for subsequent chemical treatment with mineral acids. The patent is completely silent in respect to the $P_2O_5$ up-grading by the process and no data whatsoever are given thereto on this matter. Also there is not any disclosure in respect to the behaviour of heavy metal impurities such as cadmium or sulfide constituent. The patent describes the apparatus for the treatment of phosphate rock in a particular type of installation with a raw phosphate rock material containing 12% $CO_2$ (in form of $CaCO_3$) but no data are given concerning the $P_2O_5$ content neither in the entering material nor in the phosphate product. It seems that the invention is particularly related to a specific type of equipment in which the fuel is dispersed into the mass of the phosphate rock particles in suspension, claiming to reduce the fuel consumption and thus the energy costs for the calcination process.

It is an object of the present invention to provide a simple method for the beneficiation of phosphate rock by up-grading its $P_2O_5$ content. It is another object of the present invention to provide a simple method for the beneficiation of phosphate rock by up-grading its $P_2O_5$ content wherein a substantial $P_2O_5$ recovery is achieved. It is yet another object of the present invention to provide a simple method for beneficiation of phosphate rock, obtaining a bright-gray product in which the cadmium and sulfide contents are substantially reduced compared with those obtained by other methods. Thus the invention consists in a method for the beneficiation of phosphate rock by up-grading its $P_2O_5$ content which comprises the steps of:

(a) contacting the phosphate rock with hot gases having a temperature in the range of between 700° C. to 1600° C. for a period of below 60 seconds;
(b) removing the fine particles resulting in step (a) by a conventional classification method thus separating an up-graded phosphate product.

In principle any classification normally utilized for the separation of solids on the basis of size can be successfully utilized. Typical examples of such classification are pneumatic classification, mechanical sieving, elutriation by a liquid or by a gas.

The invention is based on the disintegration of the calcite matrix which separates out easily from the unchanged apatite crystals, due to the thermal shock in the contact between the hot gases with the phosphate rock particles. During said contact, some thermal decomposition of the calcite occurs resulting calcium oxide fine particles, but the major component in said fines is calcite obtained by the disintegration effect. This disintegration effect is a result of the different expansion coefficient of the components in the phosphate rock being accompanied by vaporization of crystalline water. Also, the attrition, erosion and mechanical shock during pneumatic conveying of particles, contribute to the disintegration of the particles. It was found that in spite of the very short contact time between the phosphate rock and the hot gases, which is below 60 seconds and in some cases even below 15 seconds, a sufficient disintegration of the calcite takes place which enables to obtain an appreciable up-grading of the phosphate rock. In contrast to the conventional calcination processes wherein a maximum thermal decomposition of the calcite was imposed in order to obtain the highest $P_2O_5$ increases after the lime slaking, in accordance with the present invention the thermal decomposition is only a minor effect along the disintegration effect which is the major effect, imparting the desired up-grading of the $P_2O_5$ content. The thermal decomposition of the calcite in the present invention has actually a negative contribution to the overall economical aspects in view of the expensive high energy required for the endothermic reaction of the calcite thermal decomposition.

The method according to the present invention is applicable to any calcareous phosphate rock which is not magmatic. In the method according to this invention only a very short contact time occurs between the phosphate rock particles and the hot gases, but this is sufficient for enabling a successful separation of the fine particles of calcite together with the lime, imparting a substantial increase in the $P_2O_5$ content of the product. In contrast to the conventional calcination methods, the method does not require the slaking operation for removing out the small amount of lime and a simple classification operation is sufficient to achive a substantial up-grading of the phosphate rock.

During the process the softer calcaro-apatitic fractions in the coarse material disintegrate with most of the apatite passing into the product fractions while the calcite is partially removed with the baghouse fines. The harder siliceous fractions remain in the coarse material and are removed by screening as oversize reject material. The size of the cut for oversize depends on the type of the raw material—degree of attrition during the process—and $P_2O_5$ distribution in the coarse material.

In addition to the $P_2O_5$ increase, it was found that the product according to the present invention has a bright-gray colour which is superior to those obtained in the conventional calcination processes. The product is also characterized by its very low insoluble sulfide ion content which is below 100 ppm and even below 50 ppm. This can be explained by the oxidative conditions, high temperature and excess of air, which avoids reduction of sulfate to sulfide. In a similar manner, the organic material generally present in most of the phosphate rocks is partially volatilized and expelled from the product. One of the advantages of the method according to the present invention is the almost complete recovery of the $P_2O_5$ present in the phosphate rock. This may be attributed to avoiding of the washing step of the line (slaking) utilized in the conventional calcination methods, which always involves some losses of $P_2O_5$ values. In the following Table 2 are summarized the results obtained with two typical samples of phosphate rock from Zin (Israel) after the contact with the hot gases (without separating out the fines).

TABLE 2

Beneficiation of phosphate rock according to the present invention.

| Type of phosphate rock | % $P_2O_5$ feed | % $P_2O_5$ in product | % $P_2O_5$ recovery | Weight recovery % | $S^-$ in the product (ppm)* |
|---|---|---|---|---|---|
| Zin "A" | 32.6 | 33.6 | 100 | 95 | 50 |
| Zin "B" | 31.4 | 32.8 | 100 | 93 | 80 |

*The product obtained by a conventional calcination method contains $S^-$ = 150 ppm.

By separating out the fine fraction having particle size below 200 mesh a more concentrated phosphate is obtained. The results of such concentrated products are summarized in the following Table 3.

TABLE 3

Beneficiation of phosphate rock according to the present invention (including the separation of the fraction of below 200 mesh).

| Type of phosphate rock | % $P_2O_5$ in feed | % $P_2O_5$ in the final product | % $P_2O_5$ recovery | Weight recovery % |
|---|---|---|---|---|
| Zin "A" | 32.6 | 34.6 | 90.6 | 88.1 |
| Zin "B" | 31.4 | 34.1 | 91.4 | 87.9 |

It has been found that the beneficiation method according to the present invention results also in a substantial decrease of the cadmium content in the final product. This is due to the fact that a substantial part of the cadmium content, is accumulated in the fines particles which are removed from the calcined product.

Another advantage of the process according to the present invention is the fact that no grinding of the phosphate rock entering into the calcination is required. It was found that even a crushing of the phosphate rock to a relatively large particle size of about ⅜" is satisfactory. The degree of attrition during the process and correspondingly the beneficiation of phosphate, may be controlled by recirculating part of the product through the flash calciner. The recirculation ratio is determined according to the type of phosphate, raw material granulometry and degree of beneficiation required. Thus for example, from a raw material containing 27.8% $P_2O_5$ and 7.2% $CO_2$, at a recirculation ratio of 1:1, a calcined product was obtained with the following composition: 32.7% $P_2O_5$; 3.4% $CO_2$ and only 3.7% free lime. It appears that during the process a partial decomposition of the carbonate takes place most of the lime being removed with the baghouse fines. Therefore, the beneficiation using the process according to the present invention avoids the known expensive method comprising the steps of rewetting the calcined product, slaking, washing out the calcium hydroxide and drying.

The method according to the present invention does not require the robust and expensive thermal equipment required in the conventional calcination processes. In order to obtain a most efficient fuel burning, a direct contact of a gas burner can be utilized, the hot gases obtained being conveyed to contact the phosphate rock particles in a simple reactor such as pipe-like type.

Figure 2:
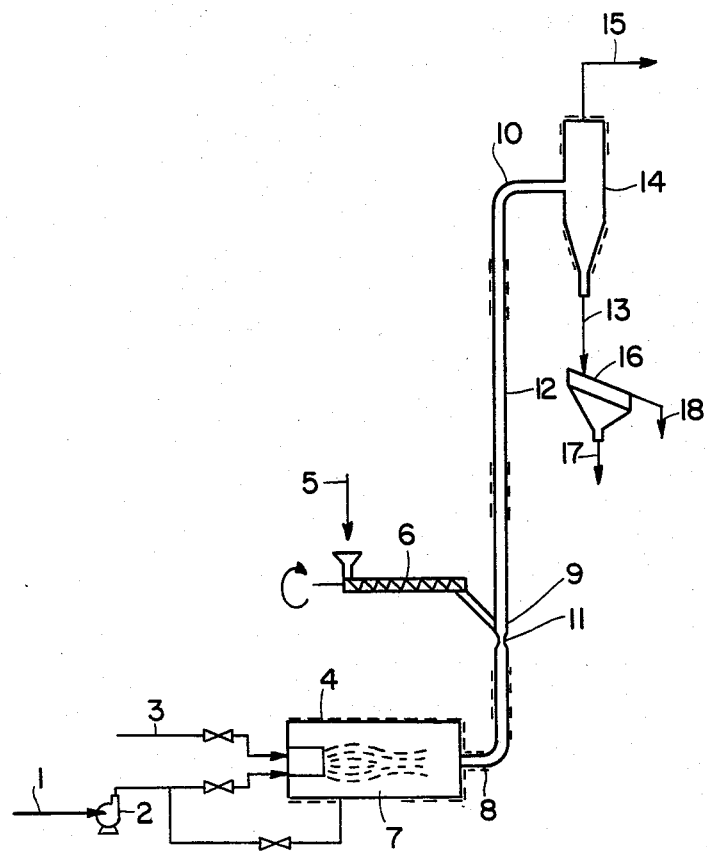

The attached drawings illustrate two types of flash calciners which can be utilized in the method according to the present invention FIG. 1, illustrates schematically a pipe-like type reactor, FIG. 2, illustrates schematically a cyclonic furnace.

However it should be understood that the thermal reactors presented are given only for illustration purposes without being limited thereto. Thus for instance any other thermal reactor such as "Tee" reactor in which a short residence time is involved will be also suitable for the method according to the present invention.

In FIG. 1 the thermal reactor consists of a gas burner (7) located in a ceramic combustion unit connected to a stainless steel duct (12) and with a cyclone (14) connected to the stack. The dust and cyclone are both insulated with a rock wool blanket (4). The phosphate rock (5) is introduced by a screw feeder (6) and contacts the hot combustion gases near the burner outlet, through a venturi section (11) in the duct (12) to avoid back pressure in the feed system. The hot phosphate (13) is collected from the cyclone (14) and separated on sieve (16) from which the fines (17) are removed and the final up-graded phosphate product (18) is separated. Temperatures were measured at the burner outlet (8), near the venturi (9) and the cyclone entrance (10). The hot gases temperature was controlled by the butane gas feed rate (3) and the primary (1) and secondary air ratio.

Superficial velocities of combustion gases in the duct ranged between about 27 m/sec at 600° C. and 39 m/sec at 1000° C. as estimated by measuring stack gas velocities with a pivot tube and making corrections for temperature. The residence time of the phosphate in the system was less than about 30 seconds.

FIG. 2, illustrates another flash calciner which consists in a cyclonic furnace and a series of cyclones connected in line: two to four cyclones for drying and preheating the feed material with the hot combustion gases obtained in the flash calciner and two to four cyclones for preheating air with the hot calcined product leaving the flash furnace. Preheated phosphate rock (1) arriving from stage 2 cyclone is pneumatically conveyed by the combustion gases from stage 4 cyclone (6) to stage 3 cyclone (3). The combustion gases (2) containing entrained dust, flow to the next cyclone (stage 2) or directly to the baghouse. Preheated phosphate rock leaves stage 3 cyclone, through tipping valves (10) to the flash calciner (5). Preheated air (9) arriving from cyclonic heat exchangers is fed to the flash furnace through its bottom. Fuel (4) is injected and burned in the furnace at the rate required to maintain the desired calcination temperature. Combustion gases containing the phosphate particles, leave the flash calciner to stage 4 cyclone (6) where they are separated. Combustion gases flow to stage 3 cyclone and the calcined product leaves through the bottom of stage 4 cyclone, being divided by splitter (7) in two streams: The position of the splitter may be changed accordingly, to obtain the desired recirculation ratio. The determined amount of phosphate is pneumatically recirculated by preheated air (9) to the flash calciner and part of it (8) flows through tipping valves (10) to the next cyclone for further cooling by fresh air entering into the system.

The phosphate product obtained is much superior than the feed phosphate rock due to its low cadmium and sulfite contents as well as its higher $P_2O_5$ content and thus more attractive from a commericial point of view. The lower calcite content in the product has the advantage of a lower acid consumption than the respective phosphate rock in the decomposition of the phosphate, producing less calcium sulfate which is practically of no fertilizer value. In case of phosphoric acid manufacture, this will save also filter units and overall labour costs. It was found that the phosphate product according to the present invention reduces drastically and sometimes down to a negligible level the foam formation during the phosphate rock acidulation in the wet process phosphoric acid. Sometimes, the decomposition by a mineral acid can be carried out even in the substantial absence of any anti-foaming agents. Higher filtration rates of phosphoric acid are obtained in the decomposition of the phosphate product by sulfuric acid. Furthermore, since some of the organic matter originally present in the phosphate rock was burnt out and eliminated during the short contact with the hot gases, the phosphoric acid produced has a bright green colour compared with the brown dark colour of the wet process phosphoric acid obtained from untreated phosphate rock. While the invention will now be described in connection with certain preferred embodiments in the following Examples, it will be understood that it is not intended to limit the invention to these particular embodiments. On the contrary, it is intended to cover all alternatives, modifications and equivalents as may be included within the scope of the invention as defined by the appended claims. Thus, the following Examples which include preferred embodiments will serve to illustrate the practice of this invention, it being understood that the particulars described are by way of Example and for purposes of illustrative discussion of preferred embodiments of the present invention only and are presented to provide what is believed to be the most useful and most readily understood description of the procedure as well as of the principles and conceptual aspects of the invention.

In the examples below the percentage are expressed in weight percent unless otherwise stated.

EXAMPLE 1 (For comparison purposes)

This example does not illustrate the invention and is presented for comparison purposes only.

In the experiment, phosphate rock was calcined in a fluidized bed calciner at a residence time of 20 minutes at a temperature of about 435° C. The $P_2O_5$ content of the phosphate rock (average sample) was 32% and of the product 32.4%. The sulfur content (total) was 1% while in the product 100 ppm $S^{--}$. The cadmium content was 122 g/t $P_2O_5$ in the original phosphate rock as well as in the final product. The $P_2O_5$ content of some fractions and size distributions of the phosphate rock as well as of the product are given in the following Table 4.

TABLE 4

$P_2O_5$ concentrations and size distributions of several fractions of phosphate obtained by fludized bed calcination, temperature 435° C., residence time 20 minutes.

| | Size distribution | | | | | | |
|---|---|---|---|---|---|---|---|
| | +30 | −30 +50 | −50 +70 | −70 +100 | −100 +200 | −200 | +200 |
| Feed | | | | | | | |
| % weight | 8.2 | 18.3 | 29.5 | 24.1 | 17.2 | 2.7 | 97.3 |
| % $P_2O_5$ | 31.3 | 32.9 | 32.6 | 32.3 | 30.5 | 29.3 | 32.1 |
| Product | | | | | | | |
| % weight | 6.4 | 18.7 | 21.1 | 25.7 | 24.3 | 3.8 | 96.2 |
| % $P_2O_5$ | 31.1 | 33.2 | 34.0 | 32.8 | 30.9 | 28.4 | 32.6 |

The above comparative results show that only a very poor beneficiation, if at all, could be obtained when the phosphate rock is calcined in a conventional fluidized bed and separated in its main fractions based on their particle size. No change at all occured in the cadmium content.

EXAMPLE 2

In the following experiment, the method was tested in a cyclone furnace consisting of a reactor and cyclone system for separation of the product as illustrated in FIG. 2. Phosphate rock (Zin, Israel) after grinding and screened to −10 mesh at the rate of 90 kg/h (with the following composition: $P_2O_5$: 32.7%; $CO_2$: 6.1%; s (total): 1% and Cd 122 g/ton $P_2O_5$) was conveyed to the furnace. It was preheated by combustion gases so that entered into the cyclone furnace at a temperature of 511° C. The combustion air was preheated in an air heater operated by combustion of fuel oil to a temperature of 593° C. and at a rate of 240 m³/h (measured at standard temperature and pressure). The oxygen content in the combustion gases was 3.8%. Part of the product was recycled to the furnace at a recycle ratio of 8:1 (product:feed) the total residence time being 8 seconds (one passage being 1 second).

The calcined reaction mixture going out from the cyclone furnace (t=893° C.) entered into another cyclone whereby the phosphate product separated out (t=776° C.) from the outgoing gases (t=882° C.).

The composition of the product was: $P_2O_5$=35.7%; $CO_2$=2.15%; $S^{--}$=110 ppm and Cd=44.5 g/ton $P_2O_5$. The fines going out with the combustion gases were separated by another cyclone their composition being: $P_2O_5$=20.6%; $CO_2$=10.9% and Cd=777 g/ton $P_2O_5$.

About 90% of the entering feed was found in the product while 10% in the fines so that the total $P_2O_5$ recovery was 94%.

EXAMPLE 3

The same furnace as in Example 2 was utilized in this experiment, using the same Zin phosphate rock feed at the rate of 90 kg/h. The preheated feed (by the combustion gases) entered into the furnace at a temperature of 462° C. The combustion air preheated to a temperature of 657° C., containing 4.2% oxygen, entered into the furnace at the rate of 224 m³/h (measured at standard temperature and pressure). The residence time was also 8 seconds as in Example 5 (with recycling of the product at a ratio 8:1).

The reaction mixture product going out from the cyclone furnace (t=820° C.), entered into a cyclone whereby the product separated out (t=742° C.) from the outgoing gases (t=794° C.).

The composition of the product was: $P_2O_5$=35.3%; $CO_2$=4.31%; $S^{--}$=60 ppm and Cd=65 g/ton $P_2O_5$.

The fines going out with the combustion gases were separated by another cyclone their composition being: $P_2O_5$=23.3%; $CO_2$=9.6% and Cd=670 g/ton $P_2O_5$.

About 82% of the entering feed was found in the product while 18% in the fines so that the total $P_2O_5$ recovery was 87.3%.

EXAMPLE 4

The same furnace as in Example 2 was utilized in this experiment, using the same Zin phosphate rock feed at the rate of 44.8 kg/h. The preheated feed entered into the furnace at a temperature of 469° C. The combustion air, preheated by the product at a temperature of 507° C., containing 4.5% oxygen, entered into the furnace at the rate of 218 m³/h (measured at standard temperature and pressure). No recycle of product was done in this experiment, the residence time being 1 second.

The reaction mixture product going out from the cyclone furnace (t=1010° C.), entered into another cyclone whereby the product separated out (t=755° C.) from the outgoing gases (t=924° C.). The composition of the product was: $P_2O_5$=35.8%; $CO_2$=2.3% and Cd=22 g/ton $P_2O_5$.

The fines going out with the combustion gases were separated by another cyclone, their composition being: $P_2O_5$=22.4%; $CO_2$=10.2% and Cd=696 g/ton $P_2O_5$.

About 93% of the entering feed was found in the product while 7% in the fines so that the total $P_2O_5$ recovery was 95.4%.

EXAMPLE 5

Phosphate rock from Zin (Israel) having the following composition: $P_2O_5$—31.4%; $CO_2$—5.8; S(total- )—1% (the size distribution is given below in Table 4) was fed continuously to the thermal reactor as described in FIG. 1, at the rate of 6 kg/h. The temperatures of the gases in the reactor were as follows: after the phosphate rock entrance ($T_9$) 920° C. and at the end of the calciner ($T_{10}$) 640° C. The residence time (i.e. contact time between the hot gases and the phosphate rock particles) was about 8 seconds.

The product obtained had the following composition: $P_2O_5$—32.8%; $CO_2$—5.3% and $S^-$ 80 ppm. The size distribution is given in the following Table 4, along with that of the phosphate rock entering the thermal reactor.

TABLE 5

P$_2$O$_5$ concentrations and size distributions of several fractions of the phosphate rock and phosphate product.

| | | Size distribution | | | | | | |
|---|---|---|---|---|---|---|---|---|
| | | +50 | −50 +70 | −70 +100 | −100 +140 | −140 +200 | −200 | +200* |
| A | % weight | 35.5 | 27.2 | 19.0 | 12.7 | 3.1 | 2.5 | 97.5 |
| | P$_2$O$_5$ % | 30.2 | 33.5 | 33.4 | 30.6 | 25.3 | 21.7 | 31.6 |
| | CO$_2$ | 6.1 | 4.7 | 4.8 | 7.1 | 9.3 | 10.4 | 5.7 |
| B | % weight | 14.3 | 23.6 | 21.8 | 21.2 | 7.0 | 12.1 | 87.9 |
| | P$_2$O$_5$ % | 35.5 | 35.1 | 34.9 | 32.9 | 28.7 | 23.2 | 34.1 |
| | CO$_2$ % | 3.8 | 3.8 | 4.3 | 6.2 | 7.5 | 9.0 | 4.8 |

*The data are after the removal of the −200 mesh fraction.
A = Feed;
B = Product.

The extent of benefication appears clearly from the high content of the $P_2O_5$ in the range of 32.9% to 35.5% in the phosphate product for the fractions up to +100 mesh. The $CO_2$ content in these fractions (in the range of 3.8% to 4.3%) indicates that the product consists of a substantially pure apatite.

EXAMPLE 6

The same furnace as in Example 2 was utilized in this experiment, using a phosphate rock with the following composition: $P_2O_5$: 27.8%; $CO_2$: 7.2%; Cd=122 g/ton $P_2O_5$ and S(total)=1%. The phosphate rock was fed at the rate of 3162 kg/h while the total air rate was 1396 m$^3$/h (at standard conditions). The temperature in the various points of the calciner (illustrated in FIG. 2) were as follows:

Temperature of the inlet gas to the flash furnace (11) was 437° C.

Temperature at exit from flash furnace—from (5) to (6)—was 848° C.

Temperature at the exit from stage 4 (6) was 813° C.

Temperature of the product at discharge from stage (4) was 804° C.

Temperature of the product at discharge from stage 3 (10) was 532° C.

Temperature of the gases at exit from stage 3 (2) was 472° C.

The size distribution of the phosphate rock as well as of the product is given in the following Table 6.

TABLE 6

P$_2$O$_5$ concentrations and size distributions of several fractions of the phosphate rock and phosphate product.

| | | Size distribution | | | |
|---|---|---|---|---|---|
| | | ⅜″ +10 | −10 +20 | −20 +325 | −325* |
| A | % weight | 12.6 | 11.7 | 75.1 | 0.6 |
| | % P$_2$O$_5$ | 16.1 | 24.2 | 30.5 | 24.1 |
| B | % weight | 4.3 | 2.9 | 90.7 | 2.1 |

TABLE 6-continued

P$_2$O$_5$ concentrations and size distributions of several fractions of the phosphate rock and phosphate product.

| | Size distribution | | | |
|---|---|---|---|---|
| | ⅜″ +10 | −10 +20 | −20 +325 | −325* |
| % p$_2$o$_5$ | 13.2 | 22.2 | 33.2 | 24.2 |

*The data are after the removal of the −200 mesh fraction.
A = feed.
B = product.

The fraction of the −10 mesh calcined product, amounting to 89.9% of the total $P_2O_5$ had the following composition:

$P_2O_5$=32.7%; $CO_2$=3.4%; Cd=61 g/ton $P_2O_5$; $S^{--}$=142 ppm; CaO Free=3.7%.

The composition of the baghouse fines amounting to 8.5% of the total $P_2O_5$ was: $P_2O_5$=22.2% and Cd=811 g/ton $P_2O_5$. An amount of 1.6% of the total $P_2O_5$ was found in the +10 mesh fraction as reject.

It appears that 88.5% of the feed was found in the calcined product while the balance was entrained by the combustion gases and collected in the baghouse.

We claim:

1. A method for the beneficiation of a calcareous phosphate rock feed which is not magmatic by upgrading its $P_2O_5$ content and decreasing its cadmium content which method comprises the steps of:
   (a) contacting, in a cyclone-type reactor, the phosphate rock feed with hot gases having a temperature between 700° C. and 1600° C. for a time period which is sufficient to separate fine particles comprised of calcite, lime and cadmium from the heated phosphate rock, the time period being less than 60 seconds; and
   (b) removing the fine particles of step (a) by a classification method which separates solids on the basis of size to separate out an upgraded phosphate rock product having a higher $P_2O_5$ content and a lower cadmium content than in the phosphate rock feed.

2. A method according to claim 1, wherein the fine particles are removed by pneumatic classification.

3. A method according to claim 1, wherein the fine particles are removed by mechanical sieving.

4. A method according to claim 1, wherein the fine particles are removed by elutriation by a liquid or gas.

5. A method according to claim 1, wherein the contact time in step (a) is less than 15 seconds.

6. A method according to claim 1, wherein organic matter in the phosphate rock feed is partially volatilized and expelled from the upgraded phosphate product during step (a).

7. A method according to claim 1, wherein a predetermined amount of the calcined phosphate product is recirculated to the reactor.

8. A method for the beneficiation of a calcareous phosphate rock feed which is not magmatic by upgrading its $P_2O_5$ content and decreasing its cadmium content which method comprises the steps of:
   (a) contacting, in a pipe-type reactor, the phosphate rock feed with hot gases having a temperature between 700° C. and 1600° C. for a time period which is sufficient to separate fine particles comprised of calcite, lime and cadmium from the heated phosphate rock, the time period being less than 60 seconds; and
   (b) removing the fine particles of step (a) by a classification method which separates solids on the basis of size to separate out an upgraded phosphate product having a higher $P_2O_5$ content and a lower cadmium content than in the phosphate rock feed.

* * * * *